United States Patent
Shanmugavadivel et al.

(10) Patent No.: US 9,306,839 B2
(45) Date of Patent: Apr. 5, 2016

(54) IEEE 802.11U FAILOVER FOR A MESH NETWORK

(71) Applicant: SYMBOL TECHNOLOGIES. INC., Lincolnshire, IL (US)

(72) Inventors: Senthilraj Shanmugavadivel, Coimbatore (IN); Kiran Cherian, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 21 days.

(21) Appl. No.: 13/947,357

(22) Filed: Jul. 22, 2013

(65) Prior Publication Data

US 2015/0023155 A1    Jan. 22, 2015

(51) Int. Cl.
| | |
|---|---|
| H04W 24/04 | (2009.01) |
| H04L 12/703 | (2013.01) |
| H04W 40/24 | (2009.01) |
| H04L 12/707 | (2013.01) |

(52) U.S. Cl.
CPC .............. *H04L 45/28* (2013.01); *H04L 45/22* (2013.01); *H04W 24/04* (2013.01); *H04W 40/248* (2013.01)

(58) Field of Classification Search
CPC .............................. H04L 45/28; H04W 24/04
USPC ................................................. 370/216, 225
See application file for complete search history.

(56) References Cited

U.S. PATENT DOCUMENTS

| | | | |
|---|---|---|---|
| 7,808,987 B2 | 10/2010 | Bauer et al. | |
| 8,248,949 B2 | 8/2012 | Ozer et al. | |
| 8,305,996 B2 | 11/2012 | Rahman et al. | |
| 2007/0025274 A1* | 2/2007 | Rahman et al. | 370/254 |
| 2007/0206537 A1* | 9/2007 | Cam-Winget et al. | 370/331 |
| 2008/0084855 A1* | 4/2008 | Rahman | 370/342 |
| 2008/0170527 A1* | 7/2008 | Lundsgaard et al. | 370/312 |
| 2008/0181124 A1* | 7/2008 | Chari | 370/252 |
| 2008/0304831 A1* | 12/2008 | Miller et al. | 398/115 |
| 2009/0041039 A1* | 2/2009 | Bear et al. | 370/401 |
| 2009/0080333 A1* | 3/2009 | Ozer et al. | 370/237 |
| 2009/0154343 A1* | 6/2009 | Fitch et al. | 370/221 |
| 2009/0213730 A1* | 8/2009 | Zeng et al. | 370/217 |
| 2011/0182172 A1* | 7/2011 | Kulkarni | 370/221 |
| 2012/0224566 A1 | 9/2012 | O'Leary | |
| 2014/0281670 A1* | 9/2014 | Vasseur et al. | 714/4.11 |

FOREIGN PATENT DOCUMENTS

| | | |
|---|---|---|
| AU | 2011/210806 A1 | 7/2012 |
| WO | 2009075889 A2 | 6/2009 |

* cited by examiner

*Primary Examiner* — Chi H Pham
*Assistant Examiner* — Robert Lopata

(57) ABSTRACT

The present invention provides IEEE 802.11u failover for a mesh network that contains a root node coupled to a network operations center through a backhaul connection and coupled to a plurality of non-root nodes at least one non-root node of which being capable of IEEE 802.11u communication with an infrastructure device of an external network. A first step includes determining that a first connection to the root-node in the mesh network has been disrupted, disrupting communications on the backhaul connection. A next step includes configuring the one non-root node to act as a root node and configuring a radio of the one non-root node to act as an IEEE 802.11u client. A next step includes associating the radio to the infrastructure device of the external network using an IEEE 802.11u protocol. A next step includes establishing a secure tunnel second connection from the one non-root node to the network operations center through the infrastructure device of the external network using the IEEE 802.11u protocol. A next step includes passing backhaul data through the secure tunnel second connection.

20 Claims, 2 Drawing Sheets

IEEE 802.11U FAILOVER FOR A MESH NETWORK

BACKGROUND

Mesh communication networks, are based on self-configuring autonomous collections of devices that communicate with each other over wireless links. A mesh network is a collection of wireless nodes or devices organized in a decentralized manner to provide range extension by allowing nodes to be reached across multiple hops. In a mesh network, communication packets sent by a source node can be relayed through one or more intermediary nodes before reaching a destination node. As a result, mesh networks can provide different communication paths from one node to another, which is an advantage if there is a disruption in any one hop. Larger networks can be realized using an intelligent access points (IAPs), also known as a root node, gateway or portal, which provide wireless devices of the mesh network access to a wired backhaul, such as an Ethernet connection to an external network.

However, a problem occurs when a connection is lost at the root node itself preventing backhaul connection to the external network, either through a hardware failure, mesh backhaul connection loss, or disrupted mesh connections to the root node. The solution here is to use a completely different communication system to obtain access to the external network. However, this type of solution currently does not offer a scalable solution to network failures and they are self contained to the infrastructure devices. For example, infrastructure devices of company A will not be allowed to connect to company B and utilize the bandwidth in time critical situations. Moreover, it is cost prohibitive to provide two separate communication networks. Therefore, what is needed is a technique to provide a low-cost alternate backhaul to an external network when a connection is lost at the root node of a mesh network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
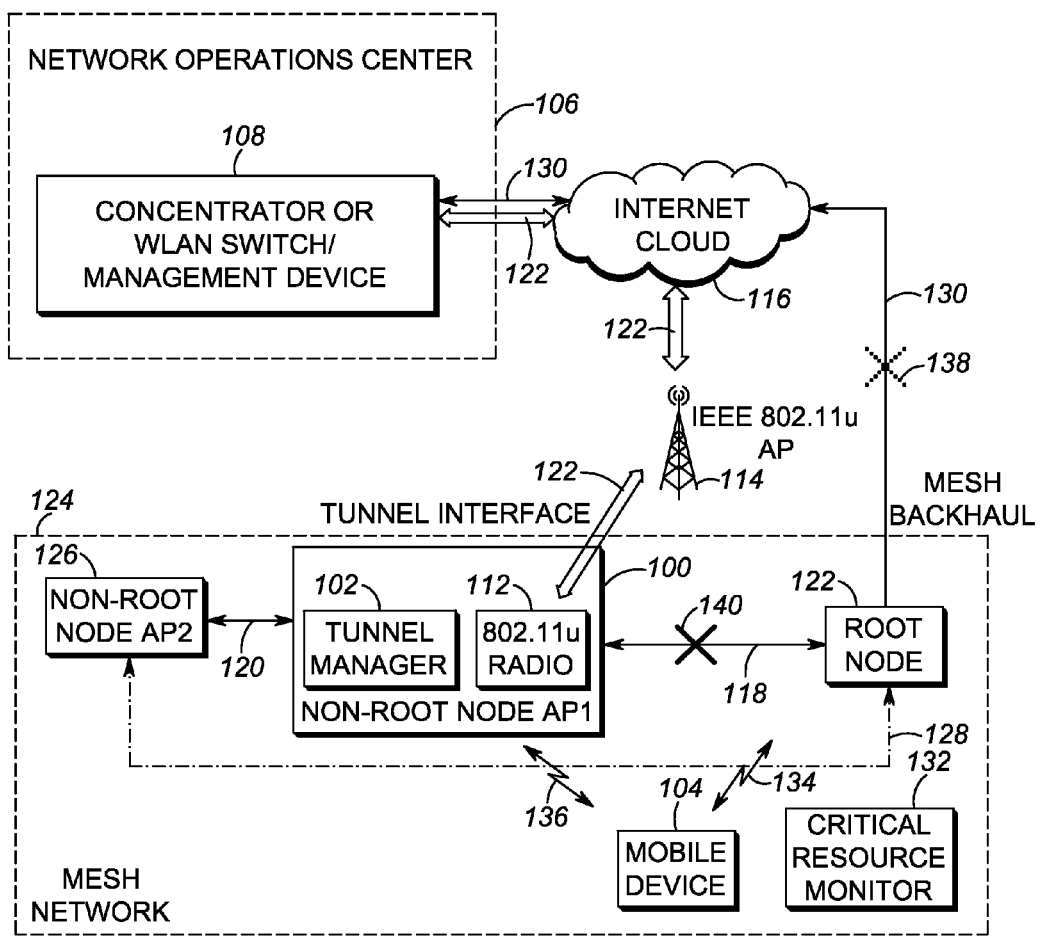
FIG. 1 is a simplified block diagram of a system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present invention provides a system and method for providing a low-cost and easy to implement alternate backhaul to an external network operations center when a connection is disrupted at (e.g. the root node of) a mesh network. In practice, a mesh network is a wireless local area network that operates using one of the IEEE 802.11 protocols.

Referring to FIG. 1, a schematic diagram illustrates a mesh network 124 that defines a mesh domain, according to some embodiments of the present invention. The mesh network 124 comprises a plurality of mesh access point (MAP) nodes (126, 100, 122) that are in wireless communication with each other and possibly with various wireless mobile devices 104 (one shown). The nodes 126, 100, 122 can also be vehicle mounted modems that connect with the mesh network. The mobile device can communicate 134 through the root node 122 directly, or hop 136, 118 through a non-root node 100 to the root node 122. As shown, only one MAP node 122 of the mesh network is presently in communication with an external wired infrastructure 116, such as a network operations center (as shown), a public land mobile network (not shown), a public switched telephone network (not shown), or an equivalent. In this example only the MAP node 122 is presently functioning as a backhaul root node between the mesh network 124 and the external network. As described in detail below, any (non-root) MAP node 126, 100 can be reconfigured to function as either a conventional mesh access point, or as an intelligent access point (IAP) that can provide root node functionality to provide an alternate backhaul connection via an external network.

As described herein, the mobile device includes any device configured with a wireless local area mesh network interface operable to transmit and receive data over IEEE 802 including, but not limited to, a wide variety of public safety devices consumer electronic platforms such as police cars, fire trucks, mobile commands center, mobile stations, mobile units, mobile nodes, user equipment, user devices, mobile devices, remote unit platforms, subscriber equipment, subscriber stations, access terminals, remote terminals, terminal equipment, laptop computers, desktop computers, tablets, netbooks, printers, scanners, smart phones, cellular phones, personal digital assistants, and the like, all referred to herein as mobile devices.

In an exemplary embodiment, such as shown in FIG. 1, the networks that present invention utilizes can include Internet, IEEE 802.11, and associated protocols, but it should be recognized that the present invention can be utilized with other protocols. Wireless local area mesh networks are generally defined in IEEE 802.11 standards and can operate over the unregulated 2.4 and 5 GHz frequency bands spectrum. However, it should be recognized that the present invention is also applicable to a communication system operable in networks that may be based on different wired or wireless technologies. For example, the description that follows can apply to an access network that is IEEE 802.xx-based, employing wireless technologies such as RF, IrDA (infrared), Bluetooth, ZigBee (and other variants of the IEEE 802.15 protocol), IEEE 802.11 (any variation), IEEE 802.16 (WiMAX or any other variation), IEEE 802.11u (Wi-Fi certified Passpoint™), IEEE 802.20, Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB, any of which can be modified to implement the embodiments of the present invention. In an exemplary embodiment, the mobile device and access point are preferably compliant with at least the IEEE 802.11 specification.

Those skilled in the art will recognize that FIG. 1 does not depict all of the equipment necessary for system to operate but only those system components and logical entities particularly relevant to the description of embodiments herein. For example, an access point, eNodeB, or base station can be connected with or comprise one or more devices such as network stations (which include access nodes, Media Access Controllers, AP controllers (and/or switches), base transceiver stations, base site controllers, packet control functions, packet control units, and/or radio network controllers. However, all of these other devices are not shown specifically. The devices of the system can communicate with either other with a wireless or wired (e.g. Ethernet) connections. Such communication can be a direct communication or a communication relayed through a higher level network entity such as a switch, controller, resource manager, and the like.

Each of the devices shown in FIG. 1 are known to also comprise basic interconnected components such as, but not limited to, radios, transceivers, antennas, keypads, speakers, microphones, displays, memories, interfaces and processors, such as microprocessors, microcontrollers, digital signal processors, application-specific integrated circuits, field programmable gate arrays, and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement a processor that performs the given logic. Therefore, each WLAN network entity and mobile device represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the tunnel configuration aspect of the present invention may be implemented in any of the devices listed above or distributed across such components. It is within the contemplation of the invention that the operating requirements of the present invention can be implemented in firmware or hardware, with the function being implemented in a software processor (or a digital signal processor) being merely a preferred option.

It is envisioned that the present invention utilizes existing wireless security protocols and other security mechanisms between the mobile device and a remote network operations center. For example, the wireless mobile can utilize IEEE 802.11i (Wi-Fi Protected Access—WPA and WPA2), AES encryption, extensible authentication protocol (EAP), and IEEE 802.1X, Wired Equivalent Privacy (WEP), etc. authentication to communicate with its home network or service provider network. Specifically, the tunnel connection enables whatever wireless security is utilized by the mobile device to be extended to the network operations center. This can include encapsulating the wireless security over another protocol, e.g. wired protocols such as IPsec, and the like to the network operations center. The AP can create other secure tunnels such as with point-to-point tunneling protocol (PPTP), layer 2 tunneling protocol (L2TP), Internet Protocol Security (IPsec), Secure Sockets Layer (SSL)/Transport Layer Security (TLS), and the like.

In typical operation, the root node 122 or intelligent access point (IAP) connects to a wireless connection 130 to a remote network operations center 106. Communications can proceed between the mobile device and the network operations center through a mesh backhaul 130 at the root node 122 of the mesh network 124.

However, if a connection to the mesh network (at the root node) is disrupted, either through the loss 138 of the backhaul connection 130, the loss 140 of the only connection 118 to the root node 122 (assuming that there are no alternate connections 120, 128 to the root node), or hardware failure of the root node 122, the mobile device 104 will not be able to carry on its data services using the root node 122/mesh backhaul 130.

Backhaul loss detection can be achieved using various techniques. One technique uses a critical resource monitor 132 incorporated into the mesh network 124, wherein the critical resource monitor periodically monitors the infrastructure of the mesh network and can detect whether connections (e.g. 118, 128) have been lost or disrupted, or whether there has been a hardware failure of one of the access points 126, 100, 122 and in particular the root node 122 intelligent access point. Another technique for backhaul loss detection is based on periodic multicasting of heartbeats from the network operations center 106 to all intelligent access points (IAPs) connected thereto. Those IAPs (e.g. 122) that cannot receive the multicast messages for a period of time are marked as lost backhauls 130. Another technique for backhaul loss detection uses unicast bidirectional acknowledgements, or pings, sent to the network operations center. This technique can monitor both directions of a backhaul link 130. In any of the above scenarios, the mobile device 104 must find an alternative connection to the network operations center.

When a connection (118 or 130) to a mesh network (root node 122) cannot be found or is lost (140 or 138, respectively) an IPSec protocol is used to establish an encrypted tunnel 122 from a radio 112 of an available non-root AP (e.g. 100), that is operable on the IEEE 802.11u standard, to any available nearby access point 114 in an external network operable on the IEEE 802.11u protocol. The particular non-root node that is chosen for this alternative backhaul 122 depends on whether the non-root node can find a nearby external IEEE 802.11u access point 114.

In particular, the present invention establishes a secure tunnel 122 between a mesh network 124 and a network operations center 106 using the IEEE 802.11u protocol and an intermediate external access point 114 operable on the IEEE 802.11u standard. The tunnel is configured by a tunnel manager 102 of the non-root AP 100, a mesh network switch (not shown), or other mesh network entity. The non-root AP is then configured as a new root node of the mesh network. The presence of the tunnel 122 allows the mobile phone to offload its data services through the mesh network via an IEEE 802.11u external network to the network operations center.

However, the presence of L3 tunnels, even when not necessary, creates unnecessary overhead and loading since these tunnels need protection with IPsec for data integrity and encryption, which is processor intensive for a network operations center concentrator and the new root node. Therefore, in the present invention Layer 3 tunnels are set up or established dynamically, only when there is a need to do so. The present invention also provides for these tunnels to be torn down when no longer needed.

Activation and deactivation of alternative backhaul connections and new root nodes, and associated reconfiguration of a mesh network, can be accomplished in various ways, according to different embodiments of the present invention. For example, when manual intervention is used, the need for an alternative backhaul can be determined by a mesh network manager. For example, loss of backhaul observed at a central server, or by emergency personnel, can trigger a manual activation of alternative backhaul connection. Automatic activation and deactivation of alternative backhaul connections may be performed by the central server, current gateway or any wireless router, including MAPs with root node and IEEE 802.11u capabilities. For example, if a mesh network is managed by a central server, the central server can activate and deactivate non-root APs as root APs, and reconfigure connections between MAPs, as network operating conditions change. Alternatively, if control of a mesh network is distributed among various MAPs or other network elements, then status information about alternative backhaul portals can be broadcast throughout the network using HELLO messages, for example.

Based on a selected activation approach (i.e., centralized or distributed), when a new root node is needed, current root nodes may send queries to other MAPs or modems to learn about alternative IEEE 802.11u backhaul capabilities. On the other hand, a central server and current root node can obtain information about a MAP with alternative backhaul capability during a registration of the MAP or modem, and the information can be updated afterwards. This enables a central server and current portal to create a list of preferred alternative root nodes. Alternatively, information can be distributed throughout an IAP/mesh domain so that MAP nodes can proactively create a list of possible alternative root nodes.

Referring back to FIG. 1, in accordance with some embodiments, the present invention provides a system for providing IEEE 802.11u failover backhaul for a mesh network 126 that contains a root node 122 coupled to a network operations center through a backhaul connection 130 and coupled to a plurality of non-root nodes 126, 100. As used herein, the mobile devices 104 do not support IEEE 802.11u, and are dependent on the mesh network for external network access. At least one non-root node 100 of the mesh network is capable of initiating an IEEE 802.11u client connection with an IEEE 802.11u capable infrastructure device 114 of an external network. A mesh entity 122, 132 is operable to determine that a first connection (118 or 130) to the root-node 122 in the mesh network cannot be found or has been lost (140 or 138, respectively), disrupting communications on the backhaul connection 130. The first connection 118 can be between the root node and the plurality of non-root nodes (if there are no other possible connections 128 to the root node). Also, the first connection 130 can be between the root node and the network operations center. The mesh entity can be a critical resource monitor 132, a central server, one of the access points 122, 100, 126 (i.e. any of the non-root nodes that are not able to communicate with the root node), or the equivalent network entity. The infrastructure device can be a switch or an access point 114 of an external IEEE 802.11u-capable network.

Upon a determination by the mesh entity that the mesh backhaul 130 can no longer be used, and after waiting a predetermined period of time before a final determination that the first connection is lost, one of the non-root nodes is chosen to be a new root node to provide an alternate backhaul connection to an external IEEE 802.11u-capable network to the network operations center. The actual choosing can be performed by one of the access points, a central server, the critical resource monitor, or other mesh network entity. The non-root node chosen 100 should be able to communicate with all other non-root nodes in the mesh domain, and must be able to initiate a client connection with an IEEE 802.11u-capable access point 114 in the external network.

Using the critical resource monitoring option, the chosen non-root node 100 is configured to act as a new root node and is operable to switch one of its radios 112 to act as an IEEE 802.11u client. Alternatively, the radio 112 can be a dedicated IEEE 802.11u radio to be turned on to act as an IEEE 802.11u client, such as used where the node is a vehicle mounted modems. The radio 112 of the new root node 100 is operable to associate to the infrastructure device of the external network using an IEEE 802.11u protocol, establish a secure IPSec tunnel second connection to the network operations center through the infrastructure device of the external network using the IEEE 802.11u protocol, and pass backhaul data through the secure tunnel second connection.

In practice, the non-root AP 100 includes a tunnel manager 102 operable to establish an end-to-end tunnel connection 122 for the mobile device 104 from the AP 100 to the network operations center 106. The tunnel 122 to the network operations center 106 could connect to a concentrator 108 or WLAN switch/management device of the network operations center. The concentrator 108 is provided specifically to handle a large number of incoming tunnels for different mobile devices. For each tunnel a mobile device is considered a virtual member of the connected network and generally can access the network as if locally connected, i.e. applications can run without any awareness that the mobile device is outside the network.

Once the alternative backhaul tunnel 122 has been established, the chosen non-root node 100 (e.g. access point or modem) is further operable to: tear down or disassociate from the secure tunnel second connection 122 when the first connection 118 or 130 has been restored, reconfigure itself to act as a non-root node again, and transfer backhaul data back to the network operations center 106 through the root-node 122 and first connection, as before.

Figure 2:
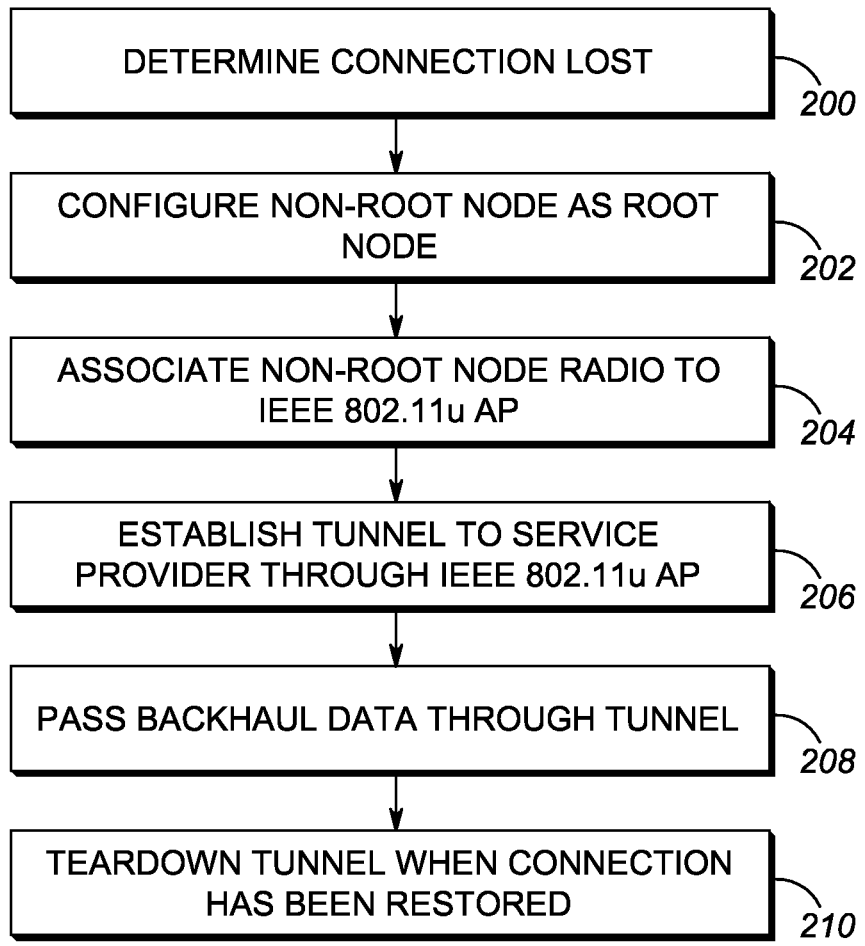
FIG. 2 is a flow diagram of a method, in accordance with some embodiments of the present invention.

FIG. 2 presents a flow diagram that illustrates a simplified sequence of a method for providing IEEE 802.11u failover for a mesh network that contains a root-node coupled to a network operations center through a backhaul connection and coupled to a plurality of non-root nodes at least one non-root node of which being capable of IEEE 802.11u communication with an infrastructure device of an external network. The one non-root node is chosen based its ability to communicate with all other non-root nodes. The infrastructure device is one of the group of a switch and an access point of the external network.

The method includes a first step 200 of determining that a first connection to the root-node in the mesh network has been lost for a predetermined period of time, disrupting communications on the backhaul connection. The first connection can be between the root node and the plurality of non-root nodes or between the root node and the network operations center. Determining that the first connection has been lost can be indicated by any of the non-root nodes not being able to communicate with the root node or by a critical resource monitor.

A next step 202 includes configuring the one non-root node to act as a root node and switching a radio of the one non-root node to act as an IEEE 802.11u client;

A next step 204 includes associating the radio to the infrastructure device of the external network using an IEEE 802.11u protocol;

A next step 206 includes establishing a secure tunnel second connection from the one non-root node to the network operations center through the infrastructure device of the external network using the IEEE 802.11u protocol; and A next step 208 includes passing backhaul data through the secure tunnel second connection.

A next step 210 includes tearing down the secure tunnel second connection when the first connection has been restored, dissociating the radio from the infrastructure device, reconfiguring the one non-root node to act as a non-root node, and transferring backhaul data back to the network operations center through the root-node.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of IEEE 802.11u failover for a mesh network that contains a root node coupled to a network operations center through a backhaul connection and coupled to a plurality of non-root nodes, at least one non-root node of which being capable of IEEE 802.11u communication with an infrastructure device of an external network, comprising:

determining that a first connection to the root-node in the mesh network is disrupted, disrupting communications on the backhaul connection;

configuring the one non-root node to act as a root node by switching one of the radios of the one non-root node to be a dedicated IEEE 802.11u radio to act as an IEEE 802.11u client;

associating the radio to the IEEE 802.11u infrastructure device of the external network using an IEEE 802.11u protocol;

establishing a secure tunnel second connection from the one non-root node to the network operations center through the infrastructure device of the external network using the IEEE 802.11u protocol; and passing backhaul data through the secure tunnel second connection.

2. The method of claim 1, wherein the secure tunnel is Layer 3 tunnel, established dynamically, only when there is a need to do so, and further comprising tearing down the secure tunnel second connection when the first connection has been restored, reconfiguring the one non-root node to act as a non-root node, and transferring backhaul data back to the network operations center through the root-node.

3. The method of claim 1, wherein the first connection is between the root node and the plurality of non-root nodes.

4. The method of claim 1, wherein the first connection is between the root node and the network operations center.

5. The method of claim 1, wherein in the determining step the first connection is disrupted for a predetermined period of time before the remaining steps are performed.

6. The method of claim 1, wherein determining that the first connection has been disrupted can be indicated by any of the non-root nodes not being able to communicate with the root node.

7. The method of claim 1, wherein the one non-root node is chosen based its ability to communicate with all other non-root nodes.

8. The method of claim 1, wherein the infrastructure device is one of the group of a switch and an access point of the external network.

9. A system comprising:
a root node coupled to a network operations center through a backhaul connection; and
a plurality of non-root nodes coupled to the root node, at least one non-root node of which being capable of IEEE 802.11u communication with an IEEE 802.11u infrastructure device of an external network; and
a mesh entity operable to determine that a first connection to the root-node in a mesh network has been disrupted, disrupting communications on the backhaul connection; whereupon the one non-root node is configured to act as a root node by switching one of the radios of the one non-root node to be a dedicated IEEE 802.11u radio to act as an IEEE 802.11u client; the radio operable to associate to the IEEE 802.11u infrastructure device of the external network using an IEEE 802.11u protocol, establish a secure tunnel second connection to the network operations center through the IEEE 802.11u infrastructure device of the external network using the IEEE 802.11u protocol, and pass backhaul data through the secure tunnel second connection.

10. The system of claim 9, wherein the secure tunnel is Layer 3 tunnel, established dynamically, only when there is a need to do so, and wherein the one non-root node is further operable to tear down the secure tunnel second connection when the first connection has been restored, reconfigure itself to act as a non-root node, and transfer backhaul data back to the network operations center through the root-node.

11. The system of claim 9, wherein the first connection is between the root node and the plurality of non-root nodes.

12. The system of claim 9, wherein the first connection is between the root node and the network operations center.

13. The system of claim 9, wherein the mesh entity waits for a predetermined period of time before determining that the first connection is disrupted.

14. The system of claim 9, wherein the mesh entity is any of the non-root nodes not being able to communicate with the root node.

15. The system of claim 9, wherein the mesh entity is a critical resource monitor.

16. The system of claim 9, wherein the one non-root node is chosen based its ability to communicate with all other non-root nodes.

17. The system of claim 9, wherein the infrastructure device is one of the group of a switch and an access point of the external network.

18. The system of claim 9, wherein the mesh entity is operable to detect a backhaul loss by periodic multicasting of heartbeats to all intelligent access points (IAPB) connected thereto, wherein any IAP that cannot receive the multicast heartbeats for a period of time are marked as a lost backhaul.

19. The system of claim 9, wherein the network operations center receives unicast bidirectional acknowledgements to monitor both directions of a backhaul link, wherein not receiving the acknowledgements for a period of time indicates a lost backhaul.

20. The system of claim 9, wherein communications on the backhaul connection are disrupted indicating that a alternative root node is needed, current root nodes are operable to send queries to other access points to determine if these other access points have IEEE 802.11u backhaul capabilities, in order to create a list of preferred alternative root nodes.

* * * * *